United States Patent
Thanner et al.

(10) Patent No.: US 8,806,654 B2
(45) Date of Patent: *Aug. 12, 2014

(54) CONTROLLING THE ACCESS OF MASTER ELEMENTS TO SLAVE ELEMENTS OVER A COMMUNICATION BUS

(75) Inventors: Manfred Thanner, Neubiberg (DE); Stefan Singer, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 1091 days.

This patent is subject to a terminal disclaimer.

(21) Appl. No.: 12/160,470

(22) PCT Filed: Jan. 13, 2006

(86) PCT No.: PCT/EP2006/050211
§ 371 (c)(1),
(2), (4) Date: Mar. 25, 2010

(87) PCT Pub. No.: WO2007/079985
PCT Pub. Date: Jul. 19, 2007

(65) Prior Publication Data
US 2010/0186080 A1    Jul. 22, 2010

(51) Int. Cl.
*G06F 21/00* (2013.01)
*G06F 21/60* (2013.01)
*G06F 21/85* (2013.01)
*G06F 21/78* (2013.01)
*G06F 13/16* (2006.01)

(52) U.S. Cl.
CPC .............. *G06F 21/606* (2013.01); *G06F 21/85* (2013.01); *G06F 21/78* (2013.01); *G06F 13/1663* (2013.01)
USPC .............. 726/27; 711/163; 709/208; 710/241

(58) Field of Classification Search
CPC .................................................. G06F 13/1663
USPC ........................................................... 713/189
See application file for complete search history.

(56) References Cited

U.S. PATENT DOCUMENTS

| | | | | |
|---|---|---|---|---|
| 4,811,215 | A * | 3/1989 | Smith | 712/214 |
| 4,853,848 | A * | 8/1989 | Mitsuhashi et al. | 711/118 |
| 6,487,562 | B1 * | 11/2002 | Mason et al. | 1/1 |
| 7,350,004 | B2 * | 3/2008 | Fukuyama et al. | 710/241 |
| 7,512,761 | B2 * | 3/2009 | Kwon | 711/163 |
| 7,725,663 | B2 * | 5/2010 | Bullman et al. | 711/152 |
| 2002/0156963 | A1 * | 10/2002 | Duranton | 711/5 |
| 2003/0031080 | A1 * | 2/2003 | Arata et al. | 365/233 |
| 2003/0147285 | A1 * | 8/2003 | Ausserlechner | 365/185.04 |
| 2003/0200451 | A1 | 10/2003 | Evans et al. | |

(Continued)

FOREIGN PATENT DOCUMENTS

| WO | 03/090086 A1 | 10/2003 |
|---|---|---|
| WO | 2005121979 A1 | 12/2005 |

OTHER PUBLICATIONS 1 http://en.wikipedia.org/wiki/System-on-a-chip.

*Primary Examiner* — Hadi Armouche
*Assistant Examiner* — Bryan Wright

(57) ABSTRACT

A system comprises one or more slave elements operably coupled to a plurality of master devices. A central protection function is operably coupled to a first communication bus and configured to control data flow between the one or more slave elements and the plurality of master devices via the communication bus.

20 Claims, 2 Drawing Sheets

(56) References Cited

U.S. PATENT DOCUMENTS

| | | | |
|---|---|---|---|
| 2004/0216144 A1* | 10/2004 | Mitsui | 719/321 |
| 2005/0114592 A1* | 5/2005 | Jin et al. | 711/113 |
| 2006/0282588 A1* | 12/2006 | Proujansky-Bell | 710/240 |
| 2010/0287443 A1* | 11/2010 | Rohleder et al. | 714/758 |

* cited by examiner

FIG. 1 – Prior art

CONTROLLING THE ACCESS OF MASTER ELEMENTS TO SLAVE ELEMENTS OVER A COMMUNICATION BUS

FIELD OF THE INVENTION

Embodiments of the present invention relate to protecting slave devices, such as memory and peripherals, in a microprocessor system. The invention is applicable to, but not limited to, an enhanced memory protection system, whereby a function controls and protects memory and peripheral accesses from master devices, such as a central processing unit (CPU), a direct memory access (DMA), co-processor, etc.

BACKGROUND OF THE INVENTION

In the field of microprocessor architectures, architecture elements known as bus masters are used to initiate bus data transfers across a communication bus. Such architecture elements may comprise a main processing core, a direct memory access (DMA), a co-processor, etc. The microprocessor architectures are often designed with protection mechanisms to protect against unallowed access to slave memory elements from master devices, as illustrated with respect to FIG. 1.

One example of a typical microprocessor architecture 100 of FIG. 1 comprises a main core, operably coupled to a memory management unit (MMU) 115 and a memory cache 120. The main CPU core 105 is operably coupled to a variety of devices and functions within the microprocessor architecture 100 via a bus or a crossbar switch 135. The CPU core 105 operates primarily as a bus master.

The crossbar switch 135 is also coupled to an external master interface 105 and a DMA element 140. The crossbar switch is also operably coupled to a series of interface elements 145. These elements are known as 'slaves', and may comprise as peripherals, a Flash memory, Static Random Access Memory (SRAM) and/or Read Only Memory (ROM). These slave elements are accessed via the bus masters. Some peripherals are also operably coupled to the CPU core 105 via an interrupt controller 125.

In the context of the present invention, a master device may be defined as a device that has the capability of initiating a bus data transfer and the capability to request bus arbitration. In a system with multiple potential bus master devices, the individual master devices need to agree on a mechanism, based, say, on a set of predefined rules, as to which master obtains ownership of the desired resource. In contrast, a slave device may be defined as a device that does not have the capability to initiate a bus request and cannot initiate a bus data transfer. In effect, a slave device containing data is accessed by a master device requiring the data.

Notably, the typical microprocessor architecture 100 provides protection to memory devices and peripherals using memory protection units (MPUs) (not shown) or memory management units (MMUs) 115, located in the processor main core.

MMUs used on current architectures only protect accesses from one master device to multiple slave devices. Additionally, MMUs are typically "page based". This means, that the granularity of those pages is very course. Granularity here means the size of an individual entry. This is insufficient for many application requirements in the 'embedded' world. The mechanism of the MMU, in most cases, can only be used in CPU cores.

MPUs used in current systems do protect all or multiple destinations. However, MPUs only protect transactions initiated by a single master device.

It is known that some master devices (such as DMA, external bus interface (EBI), etc.) offer protection for out-bound data flow. It is also known that some slave devices have protection for in-bound data flow. Thus, varying levels of protection of the memory devices, for data-flow in/out of the device, leads to inconsistent protection schemes across the architecture. The known solutions fail to protect the entire memory map, as conflicting settings may occur due to the distributed nature of the settings.

Additional master devices or bus master devices in the microprocessor architecture are either not restricted in their memory map access, or they provide insufficient protection of the slave devices. Thus, the current approaches allow only de-centralised and incoherent settings for memory mapped accesses. The de-centralized memory protection is currently available using the MMU or MPU, as described above, which restricts the accesses by the CPU core 105, or provides limited settings for use via other master devices, such as a Direct Memory Access (DMA) Controller or External Bus Interface (EBI). The protection settings are only available by each master device independently. This can lead to incoherent setting configurations, when the number of settings is insufficient or invalid settings are used.

Some microprocessor architectures offer in-bound protection for certain modules. Other microprocessor architectures provide out-bound protection for individual master devices (e.g. In-bound: MPC5554 slave bus bridges, out-bound: ATMU in PowerQuiccIII). An in-bound data transfer is a data flow into the integrated circuit that is initiated through one of the externally connected peripherals, such as an External Bus Interface (EBI). An out-bound transfer is a data flow that passes through the Address Translation and Mapping Unit (ATMU) peripheral. Such a transfer is initiated by the CPU core 105 and the data transfer is sent to the integrated circuit boundaries. Unfortunately, it is known that MMUs only protect against unallowed accesses of the main core.

Thus, today's microprocessor architectures often provide only a MPU/MMU for protecting memory and peripherals from erroneous accesses by the main CPU core. This is particularly the case for on a system-on-chip (SoC) device, as defined at:

http://en.wikipedia.org/wiki/System-on-a-chip.

However, in the field of the present invention, there exists a need for fully controlled and protected memory access for system-on-chip (SoC) devices, to encompass all potential master devices and all memory destinations. It is envisaged that future SoCs need a higher level of memory map protection and controlled memory map access, especially for safety and security applications.

Thus, a need exists for an improved protection system, for example, for slave elements such as memory elements within a microprocessor architecture, and method of operation therefor.

STATEMENT OF INVENTION

In accordance with aspects of the present invention, there is provided a protection system and method of protection therefore, as defined in the appended Claims.

Figure 1:
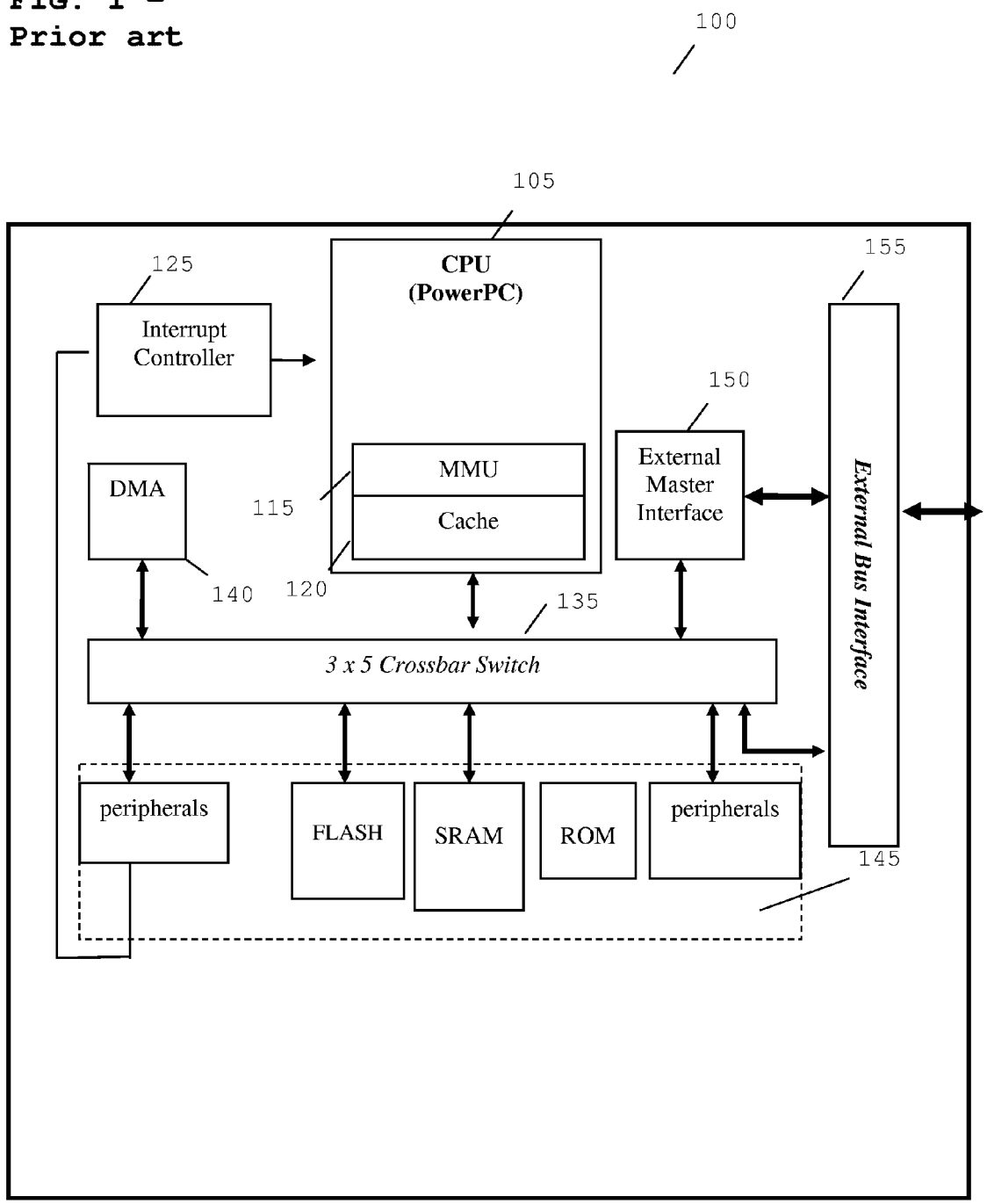
FIG. 1 illustrates a known microprocessor architecture for providing protection of a bus master device through MMU and protection for accessing only allowed memory map areas.
Figure 2:
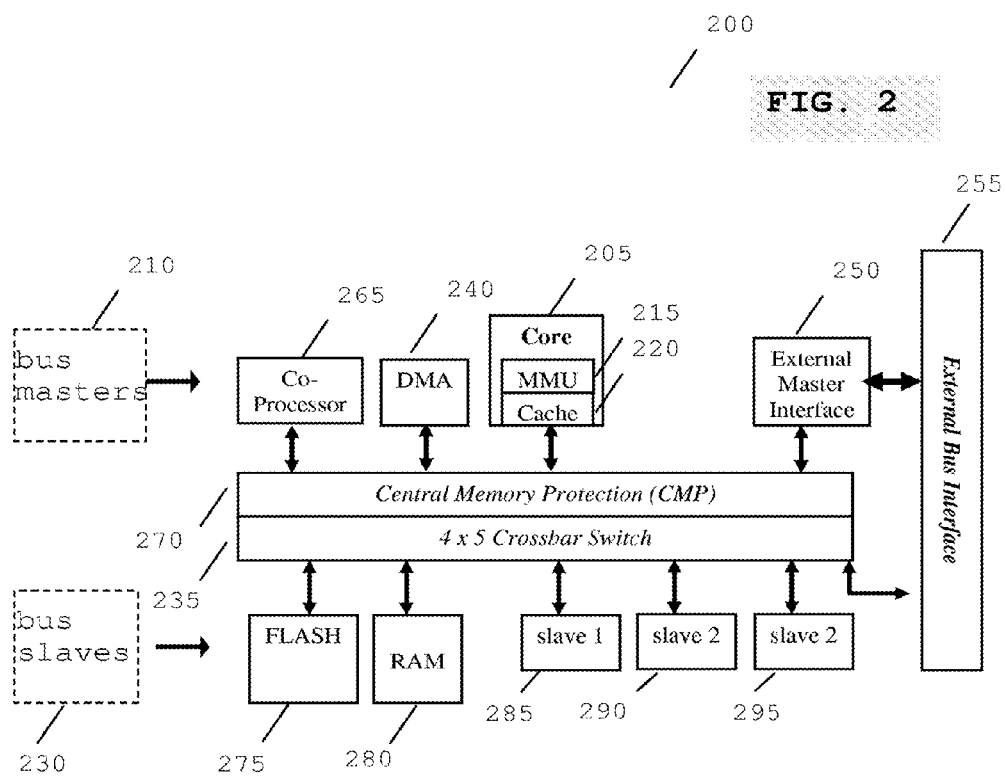

Exemplary embodiments of the present invention will now be described, by way of example only, with reference to the accompanying drawings, in which:

FIG. 2 illustrates a memory protection system in accordance with one embodiment of the present invention.

DESCRIPTION OF EMBODIMENTS OF THE INVENTION

One embodiment of the present invention will be described in terms of a microprocessor-based memory system for use with a PowerPC. However, it will be appreciated by a skilled artisan that the inventive concept herein described may be embodied in any type of memory system or SoC. In particular, it is envisaged that the inventive concept may be applied to any SoC processor or microprocessor with multiple bus masters, such as xGate™, co-processors, DMA, etc. as manufactured by Freescale Semiconductor™.

Referring now to FIG. 2, a memory protection system 200 is illustrated in accordance with one embodiment of the present invention. The memory protection system 200 is described as being located on a single integrated circuit, hereinafter referred to a system-on-chip (SoC). Notably, in one embodiment of the present invention proposes a central memory protection (CMP) function 270. The 'central' nature of the memory protection is designed to ensure that no bus data transfers are initiated on the SoC without passing the central memory protection function 270. The central location of the CMP function 270 within an SoC ensures full observability of all bus data transfers within the protection system.

The CMP function 270 is arranged to process, check and act upon each data transfer initiated by a master device, whether it be a CPU, DMA, EBI, etc. In one embodiment, the processing of the data transfer is performed according to the protection settings assigned to the CMP function 270. Here, the check is performed according to the settings assigned to the CMP function 270 and the action is based on the settings of the CMP function 270. The protection settings are implemented in specific registers inside the CMP and those are protected against incidental modification.

In one embodiment of the present invention, the process performed on the SoC comprises the following steps. A master device, such as the main processor, initiates access to a slave memory, for example an area of random access memory (RAM), via a communication bus 235. The CMP function 270 assesses the access request and determines whether the requested memory area can be accessed according to the settings of the CMP function 270. In the case where this access is allowed, then the CMP function 270 will allow access and the access request will be processed accordingly, i.e. without intervention.

In the case where access to the memory area is not allowed, an error or warning flag can be raised by the CMP function 270 and a violation of the memory area can be notified, e.g. via an interrupt signal and/or a bus transfer abort signal. In this manner, if the setting for one or more specific memory areas is limited to only a write access by the core being allowed, any other write access, say, by a DMA or co-processor, will cause an error or warning flag. This notification is then used accordingly to further investigate the cause of the violation. The main core may be able to handle the violation, or the violation may be handled by the master that initiated the request.

Thus, in response to the settings programmed into the CMP function 270, all accesses to the slave elements, such as memory, are checked against settings of the CMP function 270 to determine whether access to the one or more slave elements by any or all bus master devices is/are allowed. Upon determining an access request that is not allowed, following a check of the settings of the CMP function 270, an error or warning flag is issued.

Thus, in one embodiment of the present invention, the CMP function 270 is configured to manage and protect all memory accesses and access rights to the slave SoC elements, such as RAM, Flash memory, peripheral elements by a number of the master devices, and in a further embodiment of the present invention by all masters devices. In this manner, all bus data transfers on the SoC are observed and controlled by the CMP function 270.

In one embodiment, the CMP function 270 is operably coupled to a Crossbar switch 235, illustrated in FIG. 2 as a 4*5 Crossbar switch 235. However, it is envisaged that the CMP function 270 is not limited to this configuration and may be utilised in any other multi master device microprocessor architecture/configuration. The Core 205 is operably coupled to a variety of master devices and functions within the microprocessor architecture 200 via the 4*5 crossbar switch 235.

The 4*5 crossbar switch 235 is also coupled to an external bus interface 255 directly as well as via external master interface 250. Additionally, the 4*5 crossbar switch 235 is also coupled to a co-processor 265 and a DMA 240. The Core 205, co-processor 265, DMA 240 and external bus interface are the bus masters 210 of the SoC.

The 4*5 crossbar switch 235 is also operably coupled to a series of slave devices 285, 290, 295, which can be input/output ports. Furthermore, the 4*5 crossbar switch 235 is operably coupled to a Flash memory 275 and some form of Random Access Memory (RAM) 280. The Flash memory 275, RAM 280 and slave devices 285, 290, 295 are the bus slave elements 230 of the SoC.

Although not shown in FIG. 2, an interrupt controller is used by SoC functionality to indicate when there is a settings violation of the CMP function 270. It is envisaged that the indication of a violation can also be indicated and handled via any other suitable means, as would be appreciated by a skilled artisan.

Thus, in accordance with one embodiment of the present invention, the CMP function 270 interfaces between master devices and the communication bus, which, as mentioned in the illustrated case, is located in a centralised location such as a crossbar switch 235. In this manner, the CMP function 270 is configured to protect the internal as well as external (slave) memories from accidental or intended intrusion accesses.

Furthermore, in one embodiment, the CMP function 270 in this architecture is arranged to prohibit, or restrict, access to one or more slave elements, such as the memory elements, via, say, the external bus interface 255 or any debug ports (not shown). This provides an increased safety feature for the SoC, to protect against problems, such as code runaways, random or undesired data overwrite operations, as well as prohibiting unauthorized read-out of data via the external bus interface or debug ports, etc.

In one embodiment, the CMP function 270 is arranged such that every memory map access has to pass through the CMP function 270 and the validity of the access requests can therefore be checked. Thus, the CMP function 270 is arranged such that all memory map accesses ('read' and/or 'write' operations) are under its full control.

As the CMP function 270 is centrally located within the SoC from a functional perspective, it is also envisaged that the CMP function 270 can be used as a single programming point. In this manner, the use of a central point of control can be beneficially used to support the functionality of a corresponding Operating System (OS). In one embodiment, the OS runs as software on the main core 205, i.e. part of the OS software will configure the CMP function 270.

It is also envisaged that the CMP settings, such as 'one-time' settings, can be used and enforced to improve security and/or safety of the SoC. The advantage of such a 'one-time' setting feature is that a modification of the settings cannot be made, i.e. the 'one-time' setting feature prohibits intrusion and leads to increased security. A further advantage of a single point of programming is that, through a hardware implementation, a cross-check can be performed to rule out invalid settings.

Furthermore, in an enhanced embodiment of the present invention, the CMP function 270 is arranged to enable coherent settings for granting or restricting data flow within the SoC. The coherent settings ensure that no contradictory settings are possible, a problem that is prevalent in current microprocessor architectures supporting distributed memory protecting schemes. Thus, the use of coherent settings increases the SoC safety and security features, as no invalid data flows are possible.

Notably, in one embodiment of the present invention, the CMP function 270 controls the entire data flow within the SoC, i.e. all data flow internal to the chip. Consequently, the CMP function 270 protects the memory elements and peripheral modules, as well as external buses.

In one embodiment, access to protected memory areas is/are intercepted by the CMP function 270, thereby creating access errors that have to be handled by the CPU core. Thus, in summary, the intercepted accesses are effectively blocked. The granularity of access can be, for example, to restrict the microprocessor operation to read-only access, to read/write access or to write-only access.

In a yet further enhanced embodiment of the present invention, the CMP function 270 is arranged to provide hardware support for checking the validity of settings of the CMP function 270. The CMP function 270 is configured to internally check whether certain memory areas are inaccessible, or set in a contradictory configuration. For example, a RAM memory area may be configured as read only, i.e. no data can ever be written to the memory location.

In a yet further enhanced embodiment of the present invention, it is envisaged that the CMP function 270 may be operably coupled to a Master device's MMU, which typically performs the virtual-to-physical address translation(s) so that the CMP function 270 dynamically address up-to-date memory space.

It is also envisaged that complex rules for the slave (memory) element(s) or peripherals may be implemented. A further example would be that the access to the RAM, or any other slave area, is only set for, say, a write access with no read access allowed. It is envisaged, for example, that another check can be performed to see whether every memory area can only be written by one master device, but perhaps readable by multiple master devices.

In a yet further enhanced embodiment of the present invention, it is envisaged that the introduction of the CMP function 270 can be used in a microprocessor device supervisory mode or user mode of operation. In such a mode of operation, any invalidated software, or application in the microprocessor system 200, may be run, but notably access to the SoC's memory is restricted. In this mode of operation, the trusted Operating System (OS) Kernel, and any associated device driver, is able to run with full access rights to the memory. However, the trusted Operating System (OS) Kernel may restrict accesses of individual tasks initiated by the OS.

It will be understood that the improved protection system, as described above, aims to provide at least one or more of the following advantages:

i) The inventive concept removes the need to provide individual protection units attached to each slave memory element.

ii) The inventive concept offers enhanced protection and control of a substantial number of, if not all, memory elements and peripheral accesses, particularly within a SoC.

iii) The inventive concept can be applied to any SoC processor with multiple bus masters, such as Freescale devices MPC5554, MPC5200, X12, etc.

iv) Microprocessors with multiple master devices (e.g. XGate, central processing units (CPUs), DMA, co-processors, etc.) benefit from an increased level of safety and security features.

v) The inventive concept provides better granularity of the memory protection access compared to size MMU pages.

vi) The inventive concept provides protection for all slave devices.

vii) A centralized memory protection function facilitates a singular programming model for the memory and peripheral protection system. Peripherals, in the context of the present invention, comprise slave and master SoC elements.

In particular, it is envisaged that the aforementioned inventive concept can be applied by a semiconductor manufacturer, to any processor architecture with multiple bus masters, for example those of the Freescale™ MPC5xxx family. Furthermore, the inventive concept can be applied to any circuit or device with multiple master devices (e.g. xGate™, DMA, co-processors) that can profit from an increased level of safety and security features.

It is further envisaged that, for example, a semiconductor manufacturer may employ the inventive concept in a design of a stand-alone device SoC and or an application-specific integrated circuit (ASIC) and/or any other sub-system microprocessor element.

A skilled artisan will appreciate that in other applications, alternative functions/circuits/devices and/or other techniques may be used that accommodate the inventive concept described above. For example, although one embodiment of the present invention has been described with reference to a centralised memory processing function 270 attached to a communication bus and located within a SoC, it is envisaged that the inventive concept can be used in a distributed circuit, where respective elements are not co-located on a single IC. Thus, it is envisaged that the inventive concept of using a centralised processing function is not limited to use with a "cross bar switch" located within the device, but can be equally used with any common bus serving multiple master devices and slave devices.

Whilst the specific and preferred implementations of the embodiments of the present invention are described above, it is clear that one skilled in the art could readily apply variations and modifications of such inventive concepts.

Thus, an improved protection system has been described, wherein the aforementioned disadvantages with prior art arrangements have been substantially alleviated.

The invention claimed is:

1. A system comprising:
   one or more slave circuits operably coupled to a plurality of master devices, and
   a central protection controller operably coupled to a first communication bus and configured to control data flow between the one or more slave circuits and the plurality of master devices via the first communication bus and arranged to protect access to the one or more slave circuits, the central protection controller comprising an internal validation checker to check whether protection settings assigned to the central protection controller are in conflict with existing system read-write memory settings, wherein the internal validation checker is to check whether the protection settings configure a RAM memory area of one of the one or more slave circuits as read only for all of the master devices, and thereby the RAM memory area cannot be written to by any of the master devices.

2. The system of claim 1 wherein the one or more slave circuits is/are slave memory elements; and the central protection controller is configured to protect access to the one or more slave memory elements, to receive a request to access the one or more slave memory elements, and to determine whether a requested memory area of the one or more slave memory elements can be validly accessed according to the protection settings assigned to the central protection controller.

3. The system of claim 1, wherein the central protection controller is programmed with one-time protection settings.

4. The system of claim 1, wherein the one or more slave circuits are operably coupled to an external bus and the central protection controller is configured to control access to or from the one or more slave circuits via the external bus.

5. The system of claim 1, wherein the plurality of master devices comprise one or more of the following: a central processing unit, enhanced direct memory access, external bus interface, co-processor.

6. The system of claim 1, wherein the system is located within a system-on-chip.

7. A method for controlling access of a plurality of master elements to one or more slave memory elements, comprising:
  receiving, by a central protection engine operably coupled to a communication bus and configured to control data flow between one or more slave elements and the plurality of master devices via the communication bus, an assignment of protection settings controlling access by the master devices to the slave devices; and
  checking, by the central protection engine whether a memory area of one of the one or more slave memory elements is inaccessible, wherein the checking comprises checking whether a RAM memory area of one of the one or more slave memory elements is configured as read only for all of the master elements, and thereby cannot be written to by any of the master elements.

8. The method of claim 7, wherein:
  the central protection engine is coupled to a memory management unit (MMU) of at least one of the plurality of master devices; and
  the method further comprises dynamically addressing up-to-date memory space by the central protection engine.

9. The method of claim 7, wherein the checking comprises checking whether the assigned protection settings are set in a contradictory configuration.

10. The system of claim 1, wherein the first communication bus comprises a crossbar switch.

11. The system of claim 1, wherein:
  the central protection controller interfaces between the first communication bus and the plurality of master devices; and
  the central protection controller is arranged to receive a request by one of the plurality of master devices to access one of the one or more slave circuits over the first communication bus and to grant the request, wherein no data transfer is initiated on the first communication bus without passing through the central protection controller.

12. The system of claim 1, further comprising an interrupt controller to generate an interrupt if a requested memory area in a slave circuit cannot be validly accessed.

13. The system of claim 1, wherein the one or more slave circuits are slave memory elements, the system comprises a trusted Operating System (OS) Kernel and associated device drivers, and a mode of the central protection controller is to grant full access rights to the (OS) Kernel and associated device drivers and is to limit access to individual tasks initiated by the OS.

14. The method of claim 7, wherein:
  the method further comprises:
    receiving a request to access a memory area of one of the one or more slave memory elements;
    determining not to grant the request; and
    raising an error flag.

15. The system of claim 1, wherein the internal validation checker comprises hardware.

16. A system comprising:
  one or more slave circuits operably coupled to a plurality of master devices, a central protection controller (CPC) operably coupled to a first communication bus and configured to control data flow between the one or more slave circuits and the plurality of master devices via the first communication bus and configured to protect access to memory of the one or more slave circuits during a supervisory mode of the system; and
  a Trusted Operating System (TOS) kernel, wherein the CPC is to allow the TOS kernel and associated device drivers to run with full access rights to the memory of the one or more slave circuits during the supervisory mode of the system and the CPC is to restrict access to the memory of the one or more slave circuits by invalidated software during the supervisory mode of the system.

17. The system of claim 16, wherein the system is located within a system-on-chip.

18. The method of claim 7, wherein the checking by the central protection controller comprises checking by hardware.

19. The system of claim 16, wherein the plurality of master devices comprises one or more of the following:
  a central processing unit;
  an enhanced direct memory access;
  an external bus interface; or
  a co-processor.

20. The system of claim 16, wherein the central protection controller is programmed with one-time protection settings.

* * * * *